(12) United States Patent
Hirai

(10) Patent No.: US 8,005,997 B2
(45) Date of Patent: Aug. 23, 2011

(54) MONITORING DEVICE AND MONITORING METHOD FOR MONITORING DATA HELD IN MEMORY

(75) Inventor: Susumu Hirai, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 323 days.

(21) Appl. No.: 12/155,526

(22) Filed: Jun. 5, 2008

(65) Prior Publication Data

US 2008/0313361 A1 Dec. 18, 2008

(30) Foreign Application Priority Data

Jun. 15, 2007 (JP) ................................. 2007-159544

(51) Int. Cl.
*G06F 3/00* (2006.01)
(52) U.S. Cl. ................. 710/15; 703/23; 703/24
(58) Field of Classification Search .................. None
See application file for complete search history.

(56) References Cited

U.S. PATENT DOCUMENTS

| | | | | |
|---|---|---|---|---|
| 5,022,028 | A * | 6/1991 | Edmonds et al. ........... | 714/38 |
| 7,379,860 | B1 * | 5/2008 | Bartz et al. ............... | 703/28 |
| 2009/0009287 | A1 * | 1/2009 | Falcioni et al. ........... | 340/10.1 |

FOREIGN PATENT DOCUMENTS

JP 6-290073 10/1994

OTHER PUBLICATIONS

Ford, Ray, Monitoring Distributed Embedded Systems, 1990, IEEE, pp. 237-244.*

* cited by examiner

*Primary Examiner* — Eron J Sorrell
(74) *Attorney, Agent, or Firm* — McGinn Intellectual Property Law Group, PLLC

(57) ABSTRACT

A monitoring device according to the present invention is a monitoring device connectable between a target device including a first memory holding a first data sequentially renewed and a host device acquiring a second data coinciding with the first data held in the first memory, and includes a first bus, a second memory holding the second data, a first control portion allowing the second data to be sequentially inputted to the second memory through the first bus according to the renewal of the first data, an event detection portion outputting an event detection signal when the data flowing to the first bus satisfies an event detection condition set in advance, and a second control portion allowing the second data to be outputted from the second memory based on the event detection signal. As a result, an overlapping between a data writing period to the memory of the monitoring device and a data reading period from the memory of the monitoring device is excluded, so that the reliability of the data read from the memory of the monitoring device can be improved.

18 Claims, 9 Drawing Sheets

EVENT DETECTION CONDITION

| EVENT VALUE IV1 | 0FFEH |
|---|---|
| EVENT VALUE IV2 | 0123H |
| EVENT VALUE IV3 | 0002H |

MONITORING DEVICE AND MONITORING METHOD FOR MONITORING DATA HELD IN MEMORY

BACKGROUND OF THE INVENTION

1. Field of the Invention

The present invention relates to monitoring devices and monitoring methods, and in particular, it relates to a monitoring device and a monitoring method used when a data held in the memory of a target device is monitored in real time.

2. Description of Related Art

In recent years, the highly functional progress in semiconductor integrated devices has been remarkable. In addition, the importance of performing a high-precision verification of the operation of hardware or software in a verification target device has been increased.

At the time of the operation verification of hardware or software in the verification target device (hereinafter, referred to as target device appropriately), in general, a tool called as an emulator is used. The emulator emulates the function of a microprocessor (CPU (Central Processing Unit) of the target device, thereby to realize the operation verification of the target device.

Japanese Patent Laid-Open No. 06-290073 discloses a monitoring device for monitoring storage contents of a memory portion of an electronic control unit.

In FIG. 11 is shown a schematic configuration of the monitoring device disclosed in Japanese Patent Laid-Open No. 06-290073. As shown in FIG. 11, an electronic control unit 100 is connected with a monitoring device 101 through a cable 105. A DPRAM (Dual Port Random Access Memory) 109 of the monitoring device 101 is written with the same data as the date held in a RAM (Random Access-Memory) 102 of the electronic control unit 100. Consequently, by analyzing the data held in the DPRAM of the monitoring device 101, the operation of the electronic control unit 100 as the target device can be verified.

Now, to verify the operation of the target device with high accuracy, during the operation of the target device, it is necessary to sequentially acquire and analyze the date held in a semiconductor storage device (hereinafter, referred to as memory appropriately) of the target device. When the monitoring device is used, accompanied with the sequential renewal of the data held in the memory of the target device, the data held in the memory of the monitoring device for holding the same data as the data held in the memory of the target device is also sequentially renewed.

The present inventor has recognized that, when a memory having two ports of a data input port and a data output port is built-into the monitoring device and the data held in the memory is monitored to verify the data held in the memory in real time during the operation of the target device, a problem arises that there arises an overlapping period between a data writing period to the memory of the monitoring device and a data reading period from the memory of the monitoring device. For example, during the period when the data is read from the memory of the monitoring device, when the data held in the memory of the monitoring device is also renewed accompanied with the renewal of the memory of the target device, it is often the case that the data read from the memory of the monitoring device does not precisely reflect the data held in the memory of the target device at a certain point. As a result, to verify the operation of the target device with high accuracy becomes difficult.

As described above, it has been often the case that the data writing period to the memory of the monitoring device and the data reading period from the memory of the monitoring device overlap and the securement of the reliability of the data read from the memory of the monitoring device becomes difficult.

SUMMARY

The present invention seeks to solve one or more of the above problems, or to improve upon those problems at least in part.

In one embodiment, the monitoring device according to the present invention is a monitoring device connectable between a target device including a first memory holding a first data sequentially renewed and a host device acquiring a second data coinciding with the first data held in the first memory, and includes a first bus, a second memory holding the second data, a first control portion allowing the second data to be sequentially inputted to the second memory through the first bus according to the renewal of the first data, an event detection portion outputting an event detection signal when the data flowing to the first bus satisfies an event detection condition set in advance, and a second control portion allowing the second data to be outputted from the second memory based on the event detection signal.

When the event detection condition set in advance with the data flowing into the first bus is satisfied, the second data is outputted from the second memory. The event detection condition is set in consideration of a period in which the second data held in the second memory is not renewed. As a result, when the second data itself held in the second memory is partially or totally renewed, the outputting of the second data from the second memory is suppressed, so that the reliability of the data read from the memory of the monitoring device is improved.

In another embodiment, the monitoring method according to the present invention is a monitoring method for monitoring the data held in the first memory of the target device having the first memory to hold the first data subsequently renewed by using the second memory of the monitoring device, and sets a first event detection condition in the monitoring device, and allows the second data coinciding with the first data to be sequentially held in the second memory of the monitoring device according to the renewal of the first data, and detects whether or not the data satisfying the first event detection condition flows into the first bus of the monitoring device, and allows the second data to be outputted from the second memory based on the detection of the data which satisfies the first event detection condition.

When the data flowing to the first bus satisfies the event detection condition set in advance, the second data is outputted from the second memory. The event detection condition is set in consideration of the period in which the second data held in the second memory is not renewed. As a result, when the second data itself held in the second memory is partially or totally renewed, the outputting of the second data from the second memory is suppressed, so that the reliability of the data read from the memory of the monitoring device is improved.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

Figure 1:
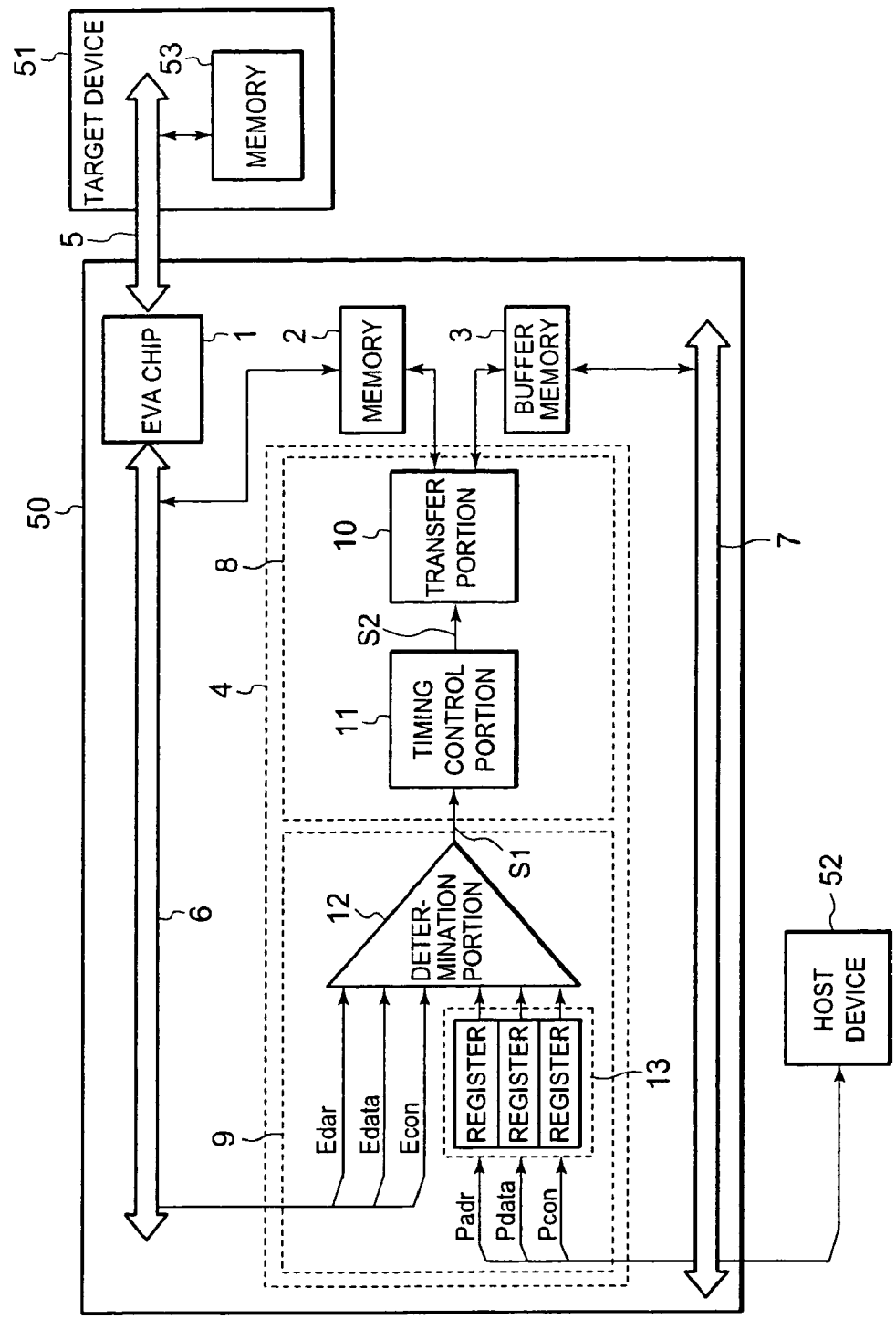
FIG. 1 is a schematic block diagram including an emulator 50 according to a first embodiment of the present invention.

The invention will be now described herein with reference to illustrative embodiments. Those skilled in the art will recognize that many alternative embodiments can be accomplished using the teachings of present invention and that the invention is not limited to the embodiments illustrated for explanatory purposes. The drawings are exclusively for description of technical matters, and do not reflect an accurate size and the like of the elements shown in the drawings. The same reference numerals are attached to the same elements, and overlapping description thereof will be omitted.

First Embodiment

Figure 2:
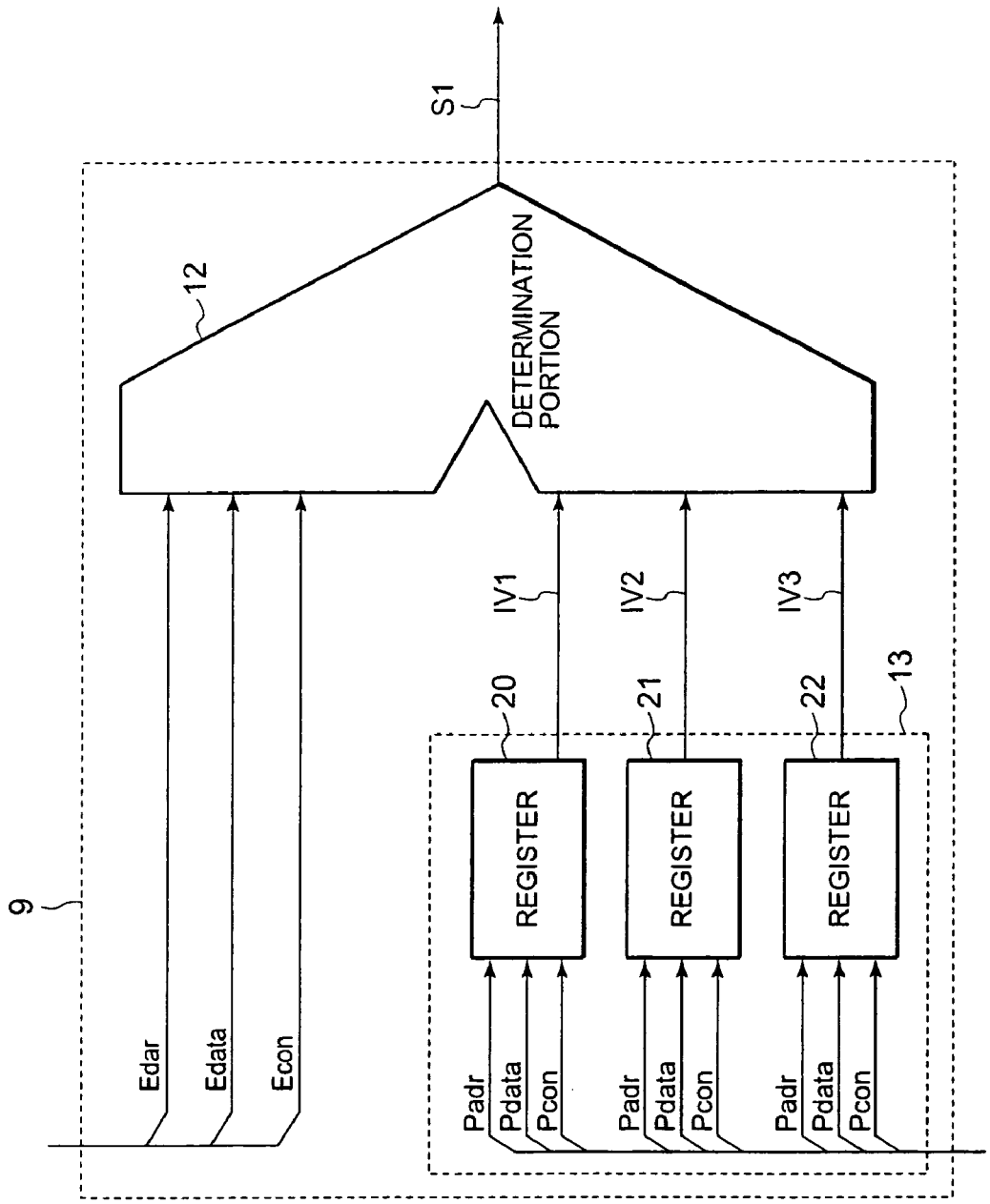
FIG. 2 is a schematic block diagram of an event detection portion 9 according to the first embodiment of the present invention.
Figures 3, 4:
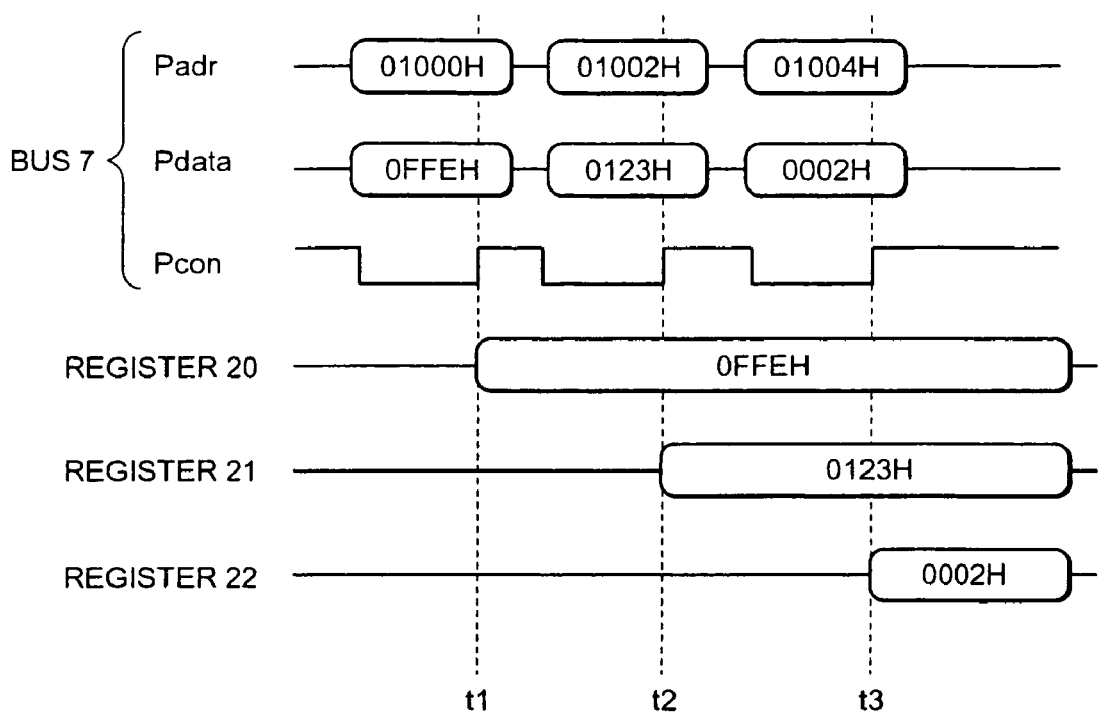
FIG. 3 is a schematic timing chart for explaining an event setting method according to the first embodiment of the present invention.
FIG. 4 is an explanatory drawing for explaining an event detection condition according to the first embodiment of the present invention.
Figure 5:
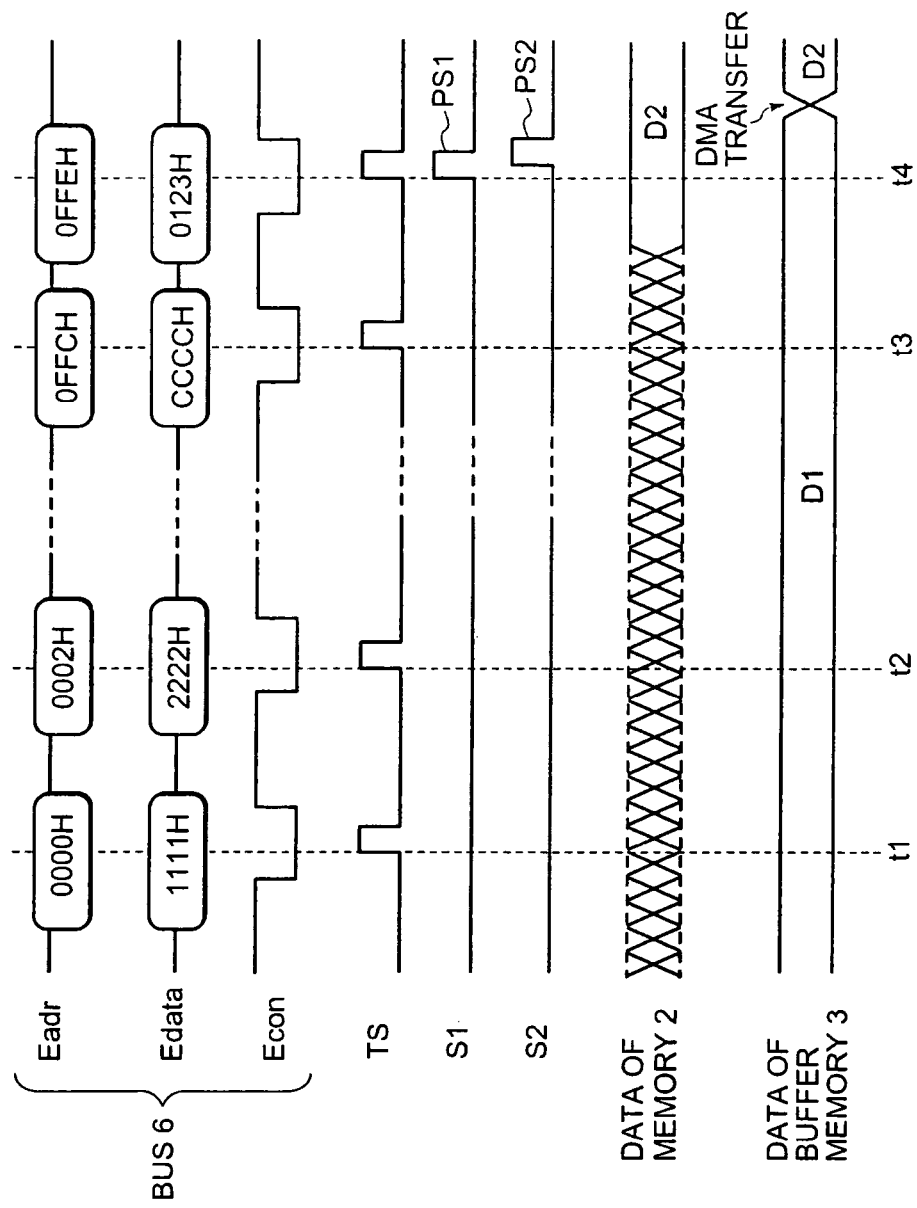
FIG. 5 is a schematic timing chart for explaining the operation of the emulator 50 according to the first embodiment of the present invention.

Hereinafter, referring to FIGS. 1 to 5, a first embodiment will be described. In FIG. 1 is shown a schematic block diagram including an emulator 50. In FIG. 2 is shown a schematic block diagram of an event detection portion 9. In FIG. 3 is shown a schematic timing chart for explaining an event setting method. In FIG. 4 is shown an explanatory drawing for explaining an event detection condition. In FIG. 5 is shown a schematic timing chart for explaining the operation of the emulator 50.

As shown in FIG. 1, the emulator (monitoring device) 50 is provided between a target device 51 and a host device 52. That is, the emulator 50 is connected to the target device 51, and at the same time, it is also connected to the host device 52. The target device 51 includes a memory (first memory) 53 for holding the data sequentially renewed accompanied with the execution of the program stored in the emulator 50 or the target device 51. The emulator 50 outputs the data (second data) coinciding with the data (first data) held in the memory 53 to the host device 52. The host device 52 acquires the data from the emulator 50, and verifies the operation of the target device 51. The host device 52 acquires memory information on the target device 51 under its operation by using the emulator 50. At this time, the emulator 50 functions as a real time monitor.

The emulator 50 is connected to the target device 51 through a probe (not shown). Further, as shown in FIG. 1, the emulator 50 needs not to be configured as a separate device from the host device 52. The emulator 50 may be integrally formed with the host device 52. The host device 52, for example, is a commonly used information processing device (computer).

As shown in FIG. 1, the emulator 50 includes an evachip (first control portion) 1, a memory (second memory) 2, a buffer memory (third memory) 3, a memory control portion 4, a bus (third bus) 5, a bus (first bus) 6, and a bus (second bus) 7. The memory control portion 4 includes a transfer control portion (second control portion) 8 and an event detection portion 9. The transfer control portion 8 includes a transfer portion 10 and a timing control portion 11. The event detection portion 9 includes a determination portion 12 and an event value holding portion 13.

The evachip 1 is a semiconductor integrated circuit for estimation of the target device 51. The evachip 1 allows the data to be inputted to the memory 53 through the bus 5. Further, the evachip 1 allows the data coinciding with the data written in the memory 53 to be inputted to the memory 2 through the bus 6. In other words, the evachip 1 outputs the same data as the data held in the memory 53 to the memory 2. Although the evachip 1 is a monolithic semiconductor integrated circuit, it is not necessarily limited to this.

The memory 2 is a DPRAM (Dual Port Random Access Memory), and includes a first port for data input and a second port for data output. The memory 2 holds the data inputted by the evachip 1 through the first port. Further, the memory 2 outputs the holding data through the second port. The memory 2 is written with the same data as the data written in the memory 53 of the target device 51. As a result, the data coinciding with the memory 53 of the target device 51 can be held in the memory 2 substantially at the same point of time. Further, the data held in the memory 2 is allowed to be appropriately outputted from the memory 2, so that the data held in the memory 53 of the target device 51 can be monitored through the memory 2 in real time.

The buffer memory 3 is a RAM (Random Access Memory), and holds the data transferred from the memory 2. The data is DMA transferred (Direct Memory Access) to the buffer memory 3 from the memory 2, so that the total data held in the memory 2 can be transferred to the buffer memory 3.

The memory control portion 4, as will be apparent from the description to be made later, allows the data held in the memory 2 to be transferred to the buffer memory 3 when the data flowing to the bus 6 satisfies the event detection condition. As a result, the overlapping of the data writing period to the memory 2 and the data reading period from the memory 2 is suppressed, thereby enabling to realize the verification of the operation of the target device with high accuracy. The date held in the buffer memory 3 is appropriately read from the host device 52. Further, the data read by the host device 52, after going through a predetermined signal processing, is displayed in the display portion (for example, a liquid crystal display) of the host device 52.

The event detection portion 9 outputs an event detection signal to the transfer control portion 8 when the data flowing to the bus 6 satisfies the event detection condition. The transfer control portion 8, based on the input of the event detection signal, allows the data held in the memory 2 to be transferred to the buffer memory 3.

The event detection portion 9 includes the determination portion 12 and the event value holding portion 13. By setting an event value to the event value holding portion 13, the event detection portion 9 is set with the event detection condition. As will be apparent by the description to be made later on, the setting of the event value to the event value holding portion 13 is executed by the host device 52.

The event value holding portion 13 holds the event value. The determination portion 12 determines whether or not the data flowing to the bus 6 satisfies the event detection condition set to the event value holding portion 13. More specifically, the determination portion 12 determines whether or not the data flowing to the bus 6 coincides with the event value set in the event value holding portion 13. The determination portion 12 outputs the event detection signal when the data flowing to the bus 6 satisfies the event detection condition.

The transfer portion 10 is a DMAC (Direct Memory Access Controller) which directly accesses to the memory 2, and executes a data transfer from the memory 2 to the buffer memory 3. The timing control portion 11 is a DMAC control portion which controls activating and stopping the transfer portion 10, and based on the input of the event detection signal, outputs a transfer start signal for instructing the transfer portion 10 to perform the data transfer from the memory 2 to the buffer memory 3. The transfer portion 10, based on the input of the transfer start signal from the timing control portion 11, executes the data transfer from the memory 2 to the buffer memory 3.

As described above, the memory 2 holds the data which coincides with the data held in the memory 53. Since the buffer memory 3 is held with the transfer data from the memory 2, the buffer memory 3 is also held with the data coinciding with the data held in the memory 53. The data held in the buffer memory 3 is appropriately read by the host device 52. In this manner, the data which coincides with the data of the memory 53 of the target device 51 is outputted from the emulator 50 to the host device 52. The host device 52 analyses the output data from the emulator 50, and verifies the operation of the target device.

Here, the connection relation of the emulator 50 will be described. As shown in FIG. 1, the evachip 1 is connected to the memory 53 of the target device 51 through the bus 5. The bus 6 is connected with the evachip 1, the memory 2 (first port of the memory 2), and the determination portion 12 of the event detection portion 9. The memory 2 is connected to the evachip 1 through the bus 6. This holds trued also with the determination portion 12 of the event detection portion 9.

The transfer portion 10 is connected to the memory 2 (the second port of the memory 2) and the buffer memory 3, respectively. Further, the bus 7 is connected with the buffer memory 3 and the event value holding portion 13. The buffer memory 3 and the host device 52 are connected through the bus 7. This holds true with the event value holding portion 13. The determination portion 12 is connected to the event value holding portion 13, and moreover, it is connected to the bus 6. A timing control portion 11 is connected to the determination portion 12 as well as to the transfer portion 10.

In FIG. 2 is shown a schematic block diagram of the event detection portion 9. As shown in FIG. 2, the event value holding portion 13 of the event detection portion 9 includes registers 20, 21, and 22. The register 20 is connected to an address bus Padr of the bus 7, a data bus Pdata of the bus 7, and a control line Pcon of the bus 7. The registers 21 and 22 are also the same as the register 20 in the connection relation. The register 20 holds an event value IV1. The register 21 holds an event value IV2. The register 22 holds an event value IV3. The event values held in the respective registers are set by the host device 52 through the bus 7. The address bus Padr, the data bus Pdata, and the control line Pcon form a unit bus of the bus 7. In other words, the address bus Padr, the data bus Pdata, and the control line Pcon are divided into three portions for each data kind flowing through the bus.

The determination portion 12 compares whether or not the data flowing to the address bus Eadr of the bus 6 coincides with the event value IV1 set in the register 20. Likewise, the determination portion 12 compares whether or not the data flowing to the data bus Edata of the bus 6 coincides with the event value IV2 set in the register 21. Further, the determination portion 12 compares whether or not the data flowing to the control line Econ of the bus 6 coincides with the event value IV3 set in the register 22.

The determination portion 12 determines that the data flowing through the bus 6 satisfies the event condition when the data flowing to the address bus Eadr of the bus 6 coincides with the event value IV1 set in the register 20, and the data flowing to the data bus Edata of the bus 6 coincides with the event value IV2 set in the register 21, and the data flowing to the control line Econ of the bus 6 coincides with the IV3 set in the register 22. The determination portion 12 outputs the event detection signal showing that the data flowing through the bus 6 satisfies the event condition.

Reference character S1 denotes a signal outputted to the timing control portion 11 from the determination portion 12, and the determination portion 12, when the data flowing through the bus 6 satisfies the event condition, changes over the signal S1 from a low level to a high level for a predetermined period, and outputs the event detection signal to the timing control portion 11. In other words, the determination portion 12, when the data flowing through the bus 6 satisfies the event condition, outputs a pulse signal PS1 (see FIG. 5) as the event detection signal.

Hereinafter, the operation of the emulator 50 will be described with reference to FIGS. 3 to 5. In FIG. 3 is shown a schematic timing chart for explaining an event setting method. In FIG. 4 is shown an explanatory drawing for explaining the event detection condition. In FIG. 5 is shown a schematic timing chart for explaining the operation of the emulator 50.

As shown in FIG. 3, the host device 52 controls the bus 7 (address bus Padr, data bus Pdata, and control bus Pcon), thereby setting an event value in each of the registers 20, 21, and 22 of the event value holding portion 13.

As shown in FIG. 3, at the time t1, 01000H is inputted to the address bus Padr, 0FFEH to the data bus Pdata, and a rising pulse of low level to the high level to the control line Pcon. The register 20 is set with the event value IV1=0FFEH. At the time t2, the address bus Padr is inputted with 01002H, the data bus Pdata is inputted with 0123H, and the control line Pcon is inputted with the rising pulse from a low level to a high level. The register 21 is set with the even value IV2=0123H. At the time of t3, the address bus Padr is inputted with 01004H, the data bus Pdata is inputted with 0002H, and the control line Pcon is inputted with the rising pulse from a low level to a high level. The register 21 is set with the event value IV3=0002H.

In this manner, the event value holding portion 13 is set with the event detection condition as shown in FIG. 4. The event condition set here is set with a signal flowing to the bus 6 at the starting time of the predetermined period in which the data held in the memory 53 of the target device 51 is not renewed.

Next, the operation of the emulator 50 will be described with reference to FIG. 5. The event detection portion 9, as shown in FIG. 4, is set with the event detection condition.

Further, the determination portion 12, based on the input of the rising pulse of a timing signal TS, determines whether or not the data flowing through the bus 6 satisfies the event detection condition set in the event value holding portion 13. Further, the buffer memory 3 is held with a data D1.

As shown in FIG. 5, at the time t1, the data flowing to the address bus Eadr of the bus 6 is 0000H, the data flowing to the data bus Edata of the bus 6 is 1111H, and the control line of the bus 6 is at a low level. This does not coincide with the event detection condition of FIG. 4. Consequently, the determination portion 12 maintains the signal S1 at a low level.

At the time t2, the data flowing to the address bus Eadr of the bus 6 is 0002H, the data flowing to the data bus Edata of the bus 6 is 2222H, and the control line of the bus 6 is at a low level. This does not coincide with the event detection condition of FIG. 4. Consequently, the determination portion 12 maintains the signal S1 at a low level.

At the time t3, the data flowing to the address bus Eadr of the bus 6 is 0FFCH, the data flowing to the data bus Edata of the bus 6 is CCCCH, and the control line of the bus 6 is at a low level. This does not coincide with the event detection condition of FIG. 4. Consequently, the determination portion 12 maintains the signal S1 at a low level.

At the time t4, the data flowing to the address bus Eadr of the bus 6 is 0FFEH, the data flowing to the data bus Edata of the bus 6 is 0123H, and the control line of the bus 6 is at a low level. At the time of t4, the data flowing through the bus 6 satisfies the event detection condition of FIG. 4. Consequently, the determination portion 12 sets the signal S1 to a high level by a predetermined period, and outputs the pulse signal PS1 (event detection signal) to the timing control portion 11. With a slight delay, the timing control portion 11, based on the input of the pulse signal PS1 from the determination portion 12, outputs a pulse signal PS2 (transfer start signal) instructing the transfer portion 10 to perform the data transfer from the memory 2 to the buffer memory 3. Thus, the data transfer (DMA (Direct Memory Access) transfer) from the memory 2 to the buffer memory 2 by the transfer portion 10 is executed. As a result, as schematically shown in FIG. 5, the data held in the buffer memory 3 is renewed from the data D1 to the data D2.

As described above, in the present embodiment, when the data flowing through the bus 6 satisfies the event detection condition, the data held in the memory 2 is transferred to the buffer memory 3. As a result, the overlapping of the data writing period to the memory 2 and the data reading period from the memory 2 is suppressed, so that the reliability of the data read from the memory 2 can be improved. As a result, the operation of the target device 51 can be verified with high accuracy.

To suppress the overlapping of the data writing period to the memory 2 and the data reading period from the memory 2, it is important to decide at which time of point the event detection condition should be set. Usually, a developer of the target device knows at which period the renewal of the data of the memory 53 should be made or not made. Consequently, in the technical field belonging to the present invention, the setting condition of the event detection condition is self-explanatory and apparent for the developer having ordinary knowledge.

Second Embodiment

Figure 6:
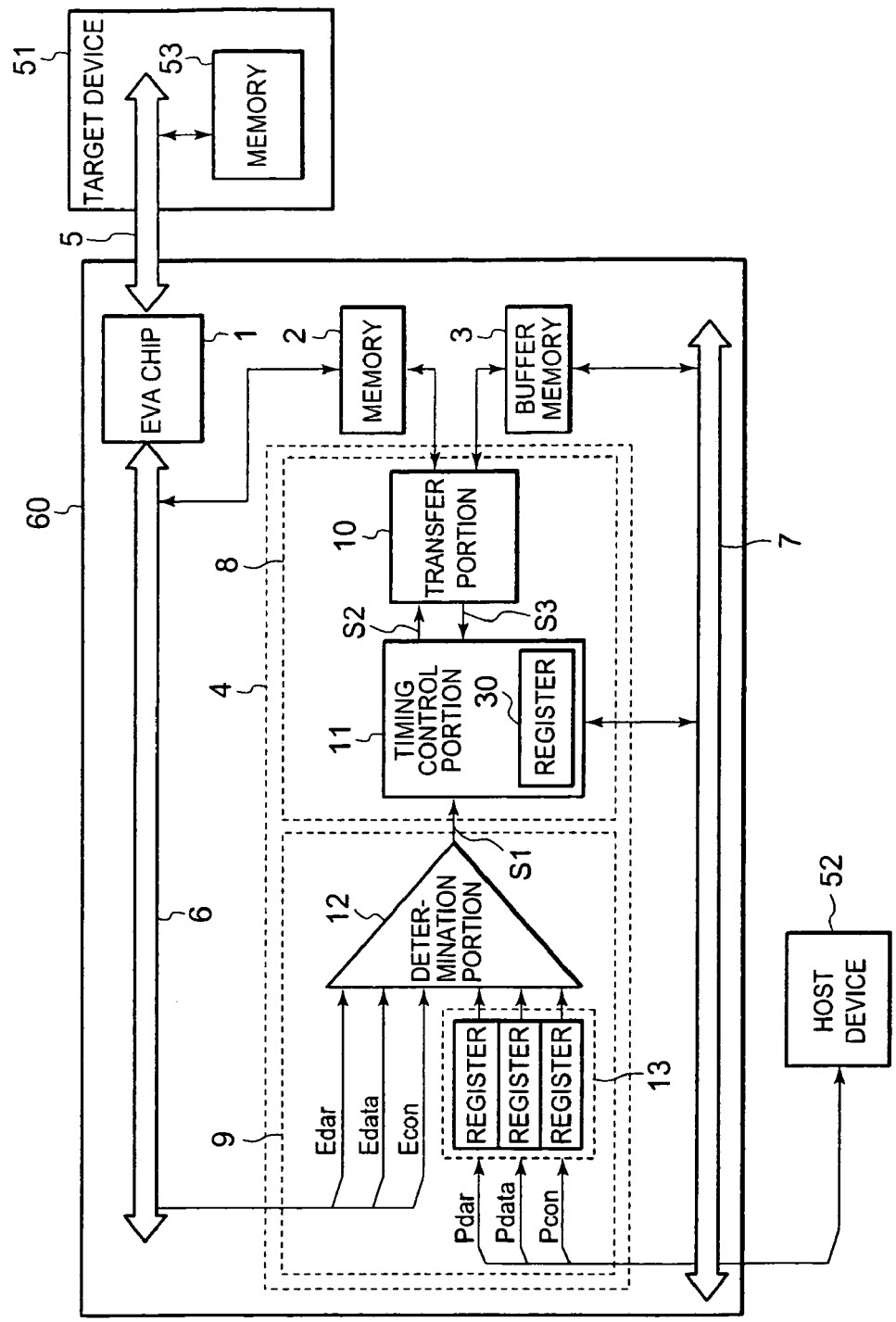
FIG. 6 is a schematic block diagram including an emulator 60 according to a second embodiment of the present invention.
Figure 7:
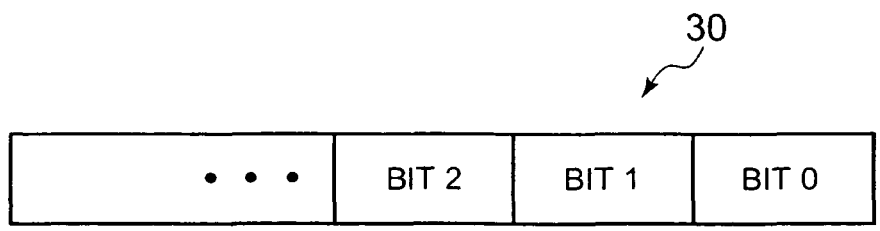
FIG. 7 is an explanatory drawing for explaining a schematic configuration of a register 30 according to the second embodiment of the present invention.
Figure 8:
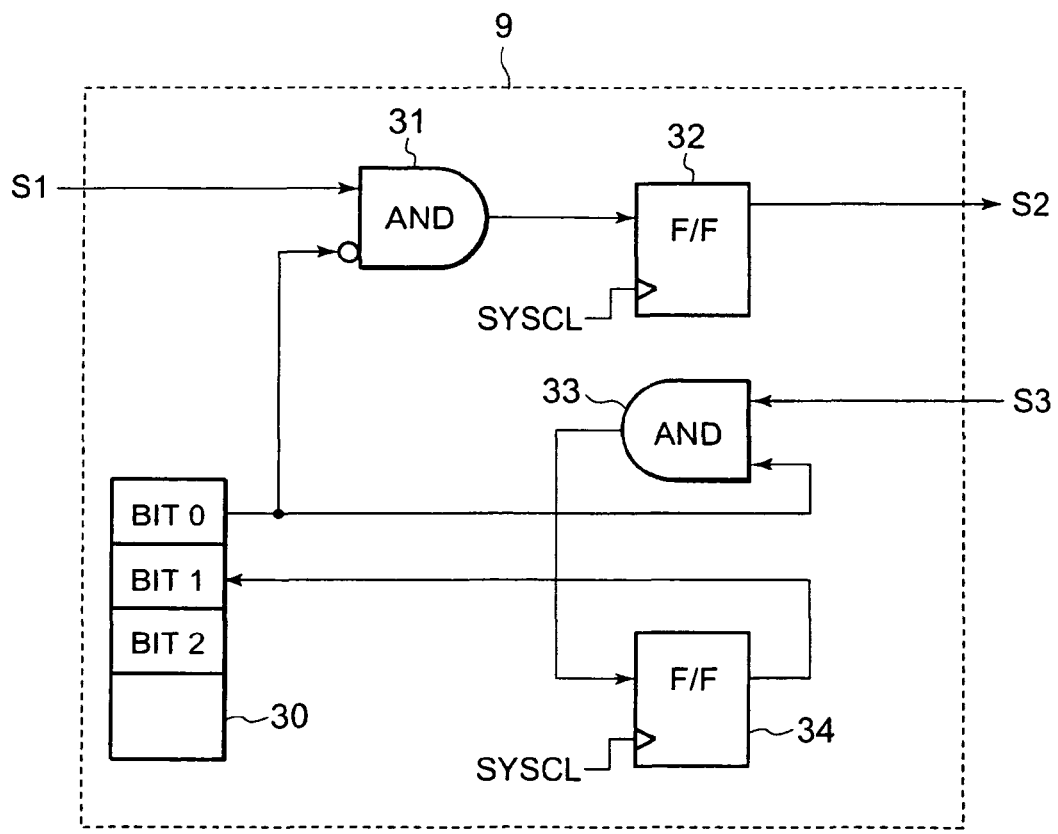
FIG. 8 is a schematic circuit diagram of a timing control portion 11 according to the second embodiment of the present invention.
Figure 9:
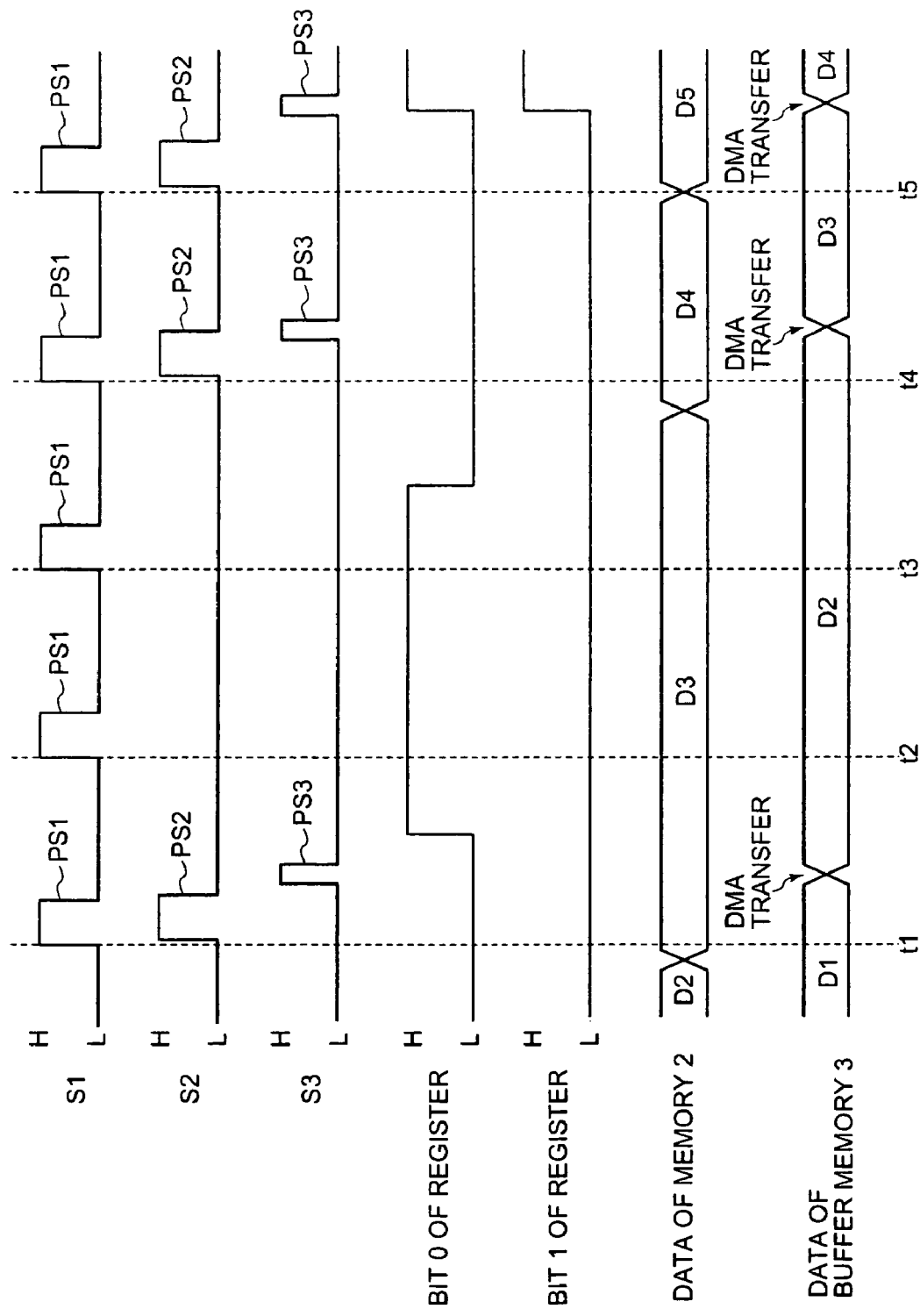
FIG. 9 is a schematic timing chart for explaining the operation of the emulator 60 according to the second embodiment of the present invention.

Hereinafter, a second embodiment will be described with reference to FIGS. 6 to 9. In FIG. 6 is shown a schematic block diagram including an emulator 60. In FIG. 7 is shown an explanatory drawing for explaining the schematic configuration of a register 30. In FIG. 8 is shown a schematic circuit diagram of a timing control portion 11. In FIG. 9 is shown a schematic timing chart for explaining the operation of the emulator 60.

As shown in FIG. 6, the emulator 60 according to the present embodiment is different from the first embodiment in that the timing control portion 11 has the register 30. Further, the timing control portion 11 is connected to a bus 7, and can be controlled from a host device 52.

As shown in FIG. 7, the register 30 includes a plurality of bits (bit 0, bit 1, bit 2, . . . ). The bit 0 holds a state value showing an access state to a buffer memory 3 from the host device 52. The bit 1 holds a competitive value showing the overlapping of a DMA transfer period by a transfer portion 10 and a data reading period from the buffer memory 3 by the host device.

The timing control portion 11 determines whether or not the data from the buffer memory 3 is read by the host device 52 at a certain point of time by referring to the state value held in the bit 0. When the data is read from the buffer memory 3 by the host device 52 at that point of time, the timing control portion 11 does not execute the DMA transfer to the buffer memory 3 from a memory 2. Hence, during the data is read from the buffer memory 3 by the host device 52, the renewal of the data held in the buffer memory 3 is suppressed, so that the reliability of the data to be finally inputted to the host device 52 is improved.

Further, the timing control portion 11, when the host device 52 starts reading the data from the buffer memory 3 during the DMA transfer period, sets a competitive value to the bit 1 of the register 30. The competitive value is a value showing that the period in which the transfer portion 10 performs the DMA transfer and the period in which the host device reads the data from the buffer memory 3 are overlapped. As a result, it can be clarified that the data read from the buffer memory 3 by the host device 52 is not suitable for the analysis of a target device 51.

AS shown in FIG. 6, the timing control portion 11 is connected with a signal S3 from the transfer portion 10. The signal S3 is a status signal showing an operation state of the transfer portion 10. The transfer portion 10, when performing the DMA transfer, sets the signal S3 to a high level for a predetermined period. In other words, the transfer portion 10, when performing the DMA transfer, outputs a pulse signal of a high level side. In this manner, the operation state of the transfer portion 10 is transmitted to the timing control portion 11.

Here, referring to FIG. 8, the specific circuit configuration of the timing control portion 11 will be described. As shown in FIG. 8, the timing control portion 11 includes an AND circuit 31, an F/F (Flip/Flop) circuit 32, an AND circuit 33, an F/F circuit 34, and a register 30.

A first input of the AND circuit 31 is connected with the output (signal S1) of a determination portion 12. A second input of the AND circuit 31 is connected with the signal value held and inverted in the bit 0 of the register 30. The output of the AND circuit 31 is connected to the input of the F/F circuit 32. The output (signal S2) of the F/F circuit 32 is connected to the input of the transfer portion 10. The first input of the AND circuit 33 is connected with the output (signal S3) of the transfer portion 10. The second input of the AND circuit 33 is connected with a signal value held in the bit 0 of the register 30. The output of the AND circuit 33 is connected to the input of the F/F circuit 34. The output of the F/F circuit 34 is connected to a bit 1 of the register 30.

The host device 52, when reading the data from the buffer memory 3, sets the signal value held in the bit 0 of the register 30 to 1 (H level). Further, the host device 52, when terminating the reading of the data from the buffer memory 3, sets the signal value held in the bit 0 to 0 (L level).

When 1 (H level) is set to the bit 0 of the register 30, the AND circuit 31 outputs the signal of a low level at any time. As a result, during the host device 52 is reading the data from the buffer memory 3, the timing control portion 11 does not instruct the transfer portion 10 to perform the DMA transfer.

Further, while the transfer portion 10 is performing the DMA transfer, the AND circuit 33 is inputted with the signal S3 of a high level. At this time, as the host device 52 starts reading the data from the buffer memory 3, the bit 0 of the register 30 is set to 1 (H level). The AND circuit 33 outputs a signal of high level. The signal of high level outputted from the AND circuit 33 is held in the F/F circuit 34, and is connected to the bit 1 of the register 30. As a result, the bit 1 of the register 30 is set with 1 (H level). In this manner, the competitive result is held in the register 30, and it becomes apparent that the data read from the buffer memory 3 by the host device 52 at this time is not suitable for the analysis of the target device 51.

Here, referring to FIG. 9, the operation of the emulator 60 will be described.

At the time t1, the data satisfying an event detection condition is inputted from a bus 6. The determination portion 12 outputs a pulse signal PS1. With a slight delay, the timing control portion 11 confirms that the bit 0 of the register is at a low level, and outputs a pulse signal PS2. The transfer portion 10, based on the input of the pulse signal PS2, executes the DMA transfer from the memory 2 to the buffer memory 3. As a result, the data held in the buffer memory 3 is renewed from the data D1 to the data D2. During the execution of the DMA transfer, the signal S3 is set to a high level.

At the time t2, the data satisfying the event detection condition is inputted from the bus 6. The determination portion 12 outputs the pulse signal PS1. However, the timing control portion 11 does not output the pulse signal PS2. This is because, at the time t2, the host device 52 reads the data from the buffer memory 3, and the bit 0 of the register is set to a high level.

At the time t3, the data satisfying the event detection condition is inputted from the bus 6. The determination portion 12 outputs the pulse signal PS1. However, the timing control portion 11 does not output the pulse signal PS2. This is because, at the time t3, the host device 52 reads the data from the buffer memory 3, and the bit 0 of the register is set to a high level.

At the time t4, the data satisfying the event detection condition is inputted from the bus 6. The determination portion 12 outputs the pulse signal PS1. The bit 0 of the register is at a low level. With a slight delay, the timing control portion 11 outputs the pulse signal PS2. The transfer portion 10 executes the DMA transfer from the memory 2 to the buffer memory 3. As a result, the data held in the buffer memory 3 is renewed from the data D2 to the data D3. During the execution of the DMA transfer, the signal S3 is set to a high level.

At the time t5, the data satisfying the event detection condition is inputted from the bus 6. The determination portion 12 outputs the pulse signal PS1. The bit 0 of the register is at a low level. With a slight delay, the timing control portion 11 outputs the pulse signal PS2. The transfer portion 10 executes the DMA transfer from the memory 2 to the buffer memory 3. As a result, the data held in the buffer memory 3 is renewed from the data D3 to the data D4. During the execution of the DMA transfer, the signal S3 is set to a high level.

Here, during the DMA transfer by the transfer portion 10, the host device 52 starts reading the data from the buffer memory 3. That is, the DMA transfer period and the data reading period by the host device 52 are overlapped. When the host device 52 starts reading the data from the buffer memory 3, the bit 0 of the register 30 is set to 1 (H level). After that, as evident from the above described description, the bit 1 of the register 30 is set to 1 (H level). In this manner, it becomes apparent that the DMA transfer period by the transfer portion 10 and the data reading period by the host device 52 are overlapped.

The value held in the bit 1 of the register 30 shall be monitored by the host device 52 from time to time.

As described above, in the present embodiment, when the host device 52 is reading the data from the buffer memory 3, the timing control portion 11 does not instruct the execution of the DMA transfer from the memory 2 to the buffer memory 3. As a result, while the host device 52 is reading the data from the buffer memory 3, the renewal of the data held in the buffer memory 3 is suppressed, so that the reliability of the data finally transferred to the host device 52 is improved.

Further, the timing control portion 11, when the host device 52 starts reading the data from the buffer memory 3 during the DMA transfer period, sets to the bit 1 of the register 30 a competitive value showing the overlapping of the DMA transfer period by the transfer portion 10 and the data reading period by the host device. As a result, it can be made apparent that the data read from the buffer memory 3 by the host device 52 is not suitable for the analysis of the target device 51.

Third Embodiment

Figure 10:
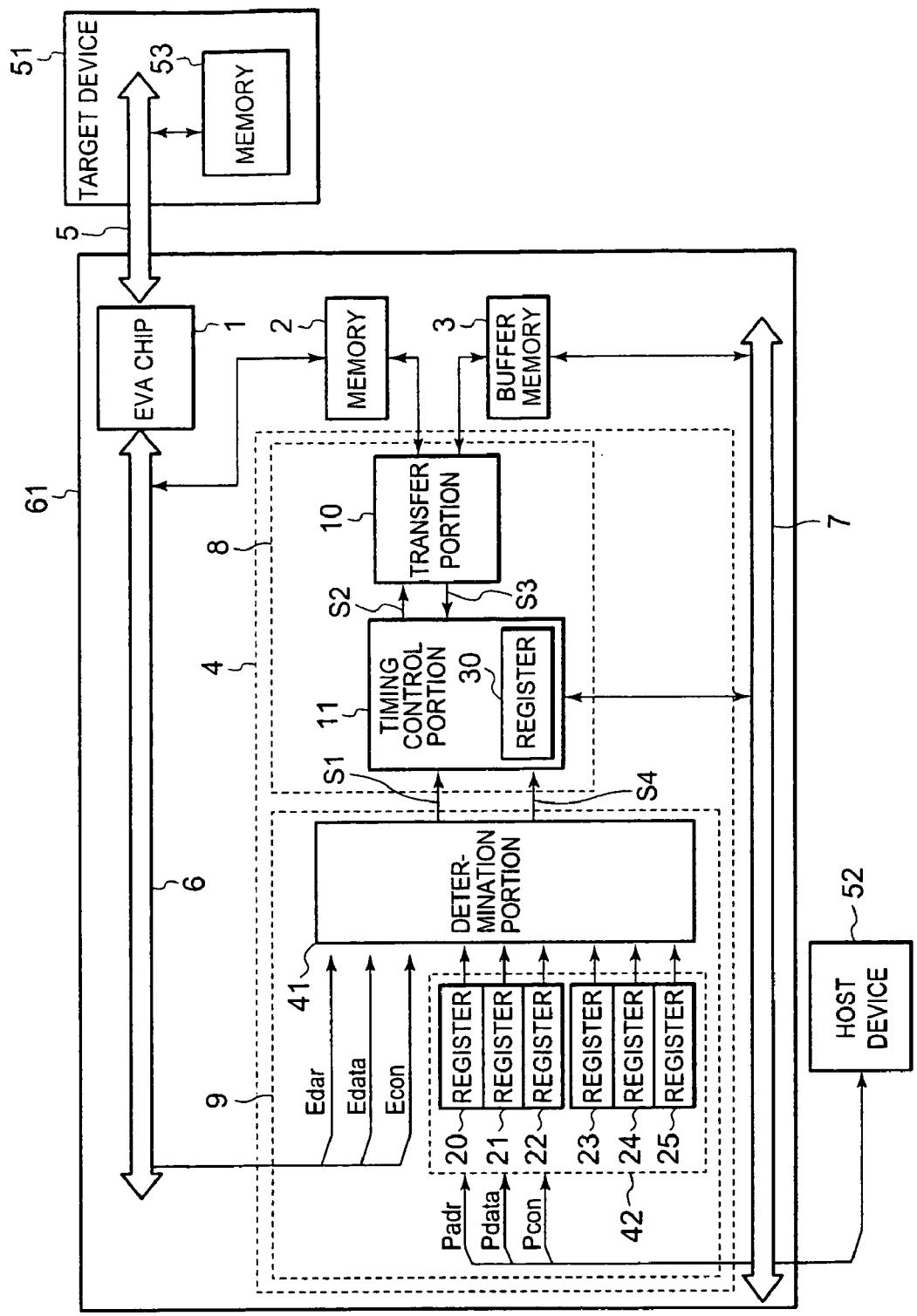
FIG. 10 is a schematic block diagram including an emulator 61 according to a third embodiment of the present invention.
Figure 11:
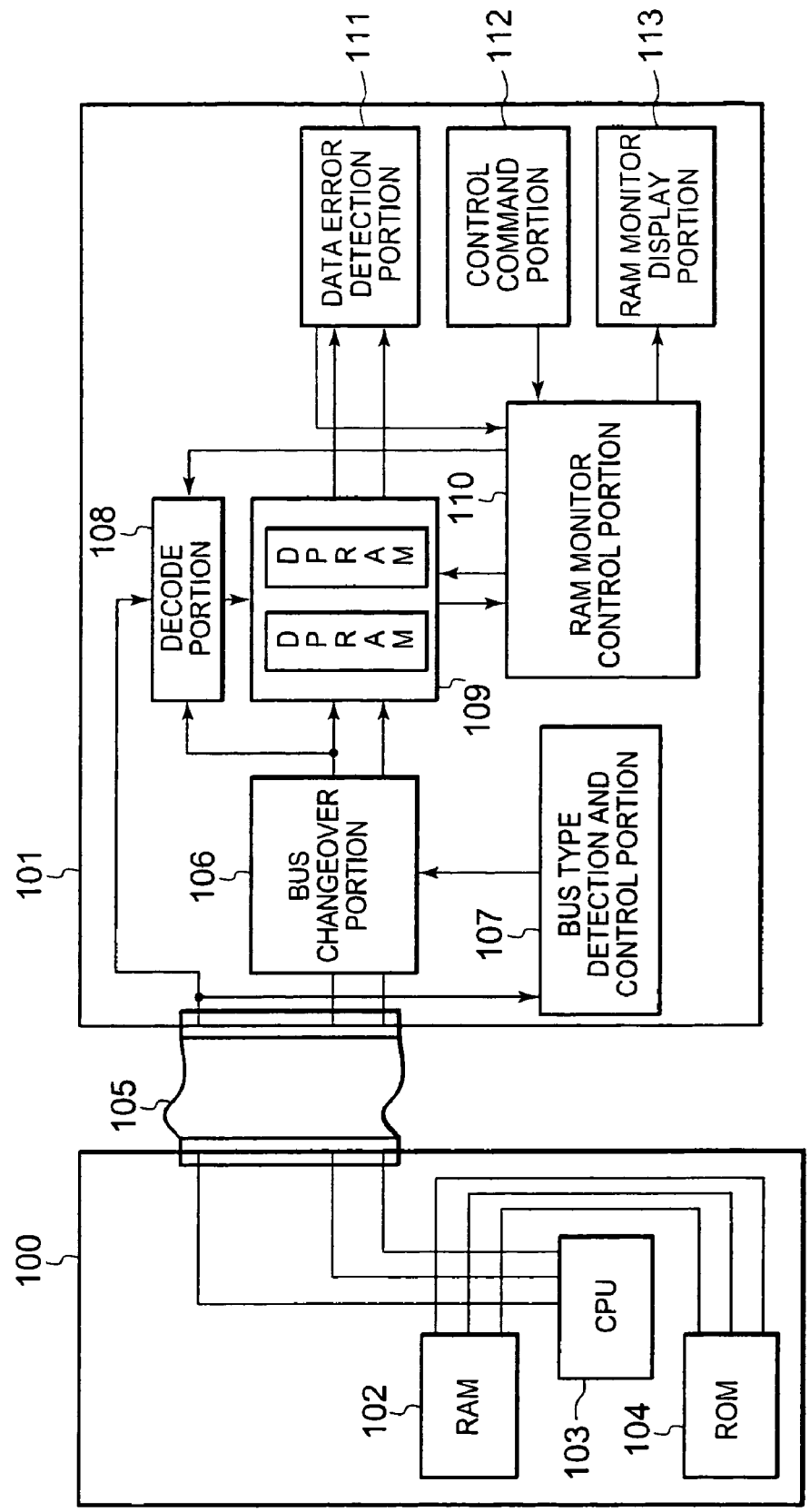
FIG. 11 is an explanatory drawing for explaining the schematic configuration of a conventional monitoring device.

Hereinafter, a third embodiment will be described with reference to FIG. 10. In FIG. 10 is shown a schematic block diagram including an emulator 61.

As shown in FIG. 10, the emulator 61 according to the present embodiment is different from the second embodiment, and an event value holding portion 42 includes registers 23 to 25 in addition to registers 20 to 22. The registers 23 to 25 are set with an event condition (second event condition) different from an event condition (first event condition) set in the registers 20 to 22.

Accompanied with the renewal of the data held unintended in a memory 53, the data held unintended in a memory 2 is also sometimes renewed. At this time, while the data is being transferred from the memory 2 to a buffer memory 3, it is often the case that the data held in the buffer memory 3 does not accurately reflect the data held in the memory 53 of a target device 51 at a certain point of time. This is because in some cases it is difficult for the designer of the target device 51 also to forecast the operation of the target device 51 with high accuracy.

In the present embodiment, when an evachip 1 allows the data to be inputted to the memory 2 through the bus 6, the data flowing to the bus 6 is set to the registers 23 to 25 in advance. A determination portion 41, when the data flowing to the bus 6 coincides with an event value set in the registers 23 to 25, sets a signal S4 to a high level for a predetermined period. That is, the determination portion 41 outputs a second event detection signal to a timing control portion 43.

The timing control portion 43, based on the input of the second event detection signal, sets a value showing a failure of DMA transfer to the bit (for example, the bit 2 of the register 30 of FIG. 7) of the register 30. As a result, it can be made apparent that the date read from the buffer memory 3 by a host device 52 is not suitable for the analysis of the target device 51.

The present invention is not limited to the emulator. The buffer memory 3 is an optional configuration element, and is not indispensable configuration element. The condition set as the event detection condition is optional, and further, the number of event detection conditions set as the event detection condition is also optional. Although the memory is a memory of a random access system, it may be of a system other than this system. The buses 5 and 6 may be configured as a common bus. The emulator may be formed of a plurality of chips by being separated for every predetermined function circuit or all function circuits may be made monolithic.

Although the invention has been described above in connection with several preferred embodiments thereof, it will be appreciated by those skilled in the art that those embodiments are provided solely for illustrating the invention, and should not be relied upon to construe the appended claims in a limiting sense.

What is claimed is:

1. A monitoring device connectable between a target device including a first memory holding a first data sequentially renewed and a host device acquiring a second data coinciding with said first data held in said first memory, the monitoring device comprising:
    a first bus;
    a second memory holding said second data;
    a first control portion allowing said second data to be sequentially inputted to said second memory through said first bus according to the renewal of said first data;
    an event detection portion outputting an event detection signal when a data flowing to said first bus satisfies an event detection condition;
    a second control portion allowing said second data to be outputted from said second memory to the host device in response to said event detection signal; and
    a third memory holding said second data outputted from said second memory,
    wherein said second control portion transfers said second data from said second memory to said third memory.

2. The monitoring device according to claim 1, wherein said first control portion is connectable to said first memory of said target device through a second bus.

3. The monitoring device according to claim 2, wherein said first control portion comprises a semiconductor integrated circuit for estimation of said target device.

4. The monitoring device according to claim 1, wherein said event detection portion comprises:
    an event value holding portion holding at least one event value; and
    a determination portion determining whether or not said data flowing to said first bus coincides with said event value and outputting said event detection signal when said data flowing to said first bus coincides with said event value.

5. The monitoring device according to claim 4, wherein said first bus includes a plurality of unit buses,
    wherein said event value holding portion holds a plurality of said event values set for every plurality of said unit buses, and
    wherein said determination portion determines whether or not said data flowing to said unit bus coincides with said event value for every said unit bus, and outputs said event detection signal when the data flowing to the unit bus by all of said unit buses coincides with said event value.

6. The monitoring device according to claim 4, wherein said event value holding portion holds said event value set by said host device.

7. The monitoring device according to claim 1, wherein said second control portion, comprises:
    a timing control portion outputting a transfer start signal in response to said event detection signal; and
    a transfer portion transferring said second data from said second memory to said third memory in response to said transfer start signal.

8. The monitoring device according to claim 7, wherein said timing control portion includes a register to hold a state value showing an access state to said third memory from said host device, and at a same time, does not output said transfer start signal when said state value of said register shows that said second data is read from said third memory by said host device.

9. The monitoring device according to claim 7, wherein said timing control portion includes a register to hold a state value showing an access state to said third memory from said host device, and at the same time, outputs said transfer start signal when said state value of said register shows that said second data is not read from said third memory by said host device.

10. The monitoring device according to claim 7, wherein said timing control portion, during said second data is being transferred from said second memory to said third memory, when said second data begins to be read from said third memory by said host device, sets a competitive value in a register.

11. The monitoring device according to claim 7, wherein said event detection portion is set with a plurality of said event detection conditions having different contents, respectively,
    wherein said transfer portion allows said second data to be transferred from said second memory to said third memory when said data flowing to said first bus satisfies said first event detection condition, and
    wherein said timing control portion, when said data flowing to said first bus satisfies said second event detection condition, sets a competitive value in the register showing that a data writing period to said second memory and a data reading period from said second memory are overlapped.

12. The monitoring device according to claim 11, wherein said first event detection condition shows that a period in which the data writing to said second memory is not executed exists over a predetermined period after the event detection, and
    wherein said second event detection condition shows that the data writing to said second memory is executed after the event detection time.

13. The monitoring device according to claim 1, wherein said second memory comprises a first port coupled to said first bus and a second port coupled to said second control portion.

14. A monitoring method for monitoring a first data held in a first memory of a target device by using a second memory of a monitoring device, the first data sequentially renewed, the monitoring method comprising:
    setting a first event detection condition in said monitoring device;
    allowing a second data coinciding with said first data to be sequentially held in said second memory of said monitoring device according to the renewal of said first data
    detecting whether or not a data satisfying said first event detection condition flows to a first bus of said monitoring device;
    allowing, in response to the detecting of said data satisfying said first event detection condition, said second data to be outputted from said second memory to a host device connected to the monitoring device;

transferring said second data from said second memory to a third memory when said data flowing to said first bus satisfies said first event detection condition; and outputting said second data from said third memory in response to a command from the host device.

15. The monitoring method according to claim 14, wherein when said second data is outputted from said third memory, said second data is not transferred from said second memory to said third memory.

16. The monitoring method according to claim 14, wherein when said second data is not outputted from said third memory, said second data is transferred from said second memory to said third memory.

17. The monitoring method according to claim 14, wherein, during the transfer of said second data from said second memory to said third memory, when said second data begins to be read from said third memory by said host device, a competitive value showing that a data writing period to said third memory and a data reading period from said third memory are overlapped is set.

18. The monitoring method according to claim 14, further comprising:

setting the second event detection condition in said monitoring device; and setting a competitive value showing a data writing period to said second memory and a data reading period from said second memory are overlapped when said data flowing to said first bus satisfies said second event detection condition.

* * * * *